(12) United States Patent
Yoon et al.

(10) Patent No.: US 11,863,510 B2
(45) Date of Patent: Jan. 2, 2024

(54) SYSTEMS AND METHODS FOR NOTIFICATION DELIVERY

(71) Applicant: Samsung Electronics Co., Ltd, Suwon-si (KR)

(72) Inventors: Suk Hwan Yoon, Mountain View, CA (US); Yujin Jung, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 152 days.

(21) Appl. No.: 15/473,492

(22) Filed: Mar. 29, 2017

(65) Prior Publication Data
US 2018/0287986 A1 Oct. 4, 2018

(51) Int. Cl.
| | |
|---|---|
| *H04L 51/224* | (2022.01) |
| *G06F 3/01* | (2006.01) |
| *H04W 8/00* | (2009.01) |
| *H04L 67/51* | (2022.01) |
| *H04L 67/55* | (2022.01) |

(52) U.S. Cl.
CPC ............ *H04L 51/224* (2022.05); *G06F 3/011* (2013.01); *H04L 67/51* (2022.05); *H04L 67/55* (2022.05); *H04W 8/005* (2013.01)

(58) Field of Classification Search
CPC ......... H04L 51/24; H04L 43/08; H04L 67/16; H04L 67/26; G06F 3/011; G06F 17/00; H04W 84/12; H04W 4/12
See application file for complete search history.

(56) References Cited

U.S. PATENT DOCUMENTS

| | | | |
|---|---|---|---|
| 7,953,808 B2 | 5/2011 | Sharp et al. | |
| 8,015,152 B2 | 9/2011 | Ozhan et al. | |
| 8,639,223 B1 * | 1/2014 | Hu | H04M 3/42 |
| | | | 455/412.1 |
| 8,943,126 B1 * | 1/2015 | Feldman | H04W 4/02 |
| | | | 709/205 |
| 2003/0229674 A1 | 12/2003 | Cabrera et al. | |

(Continued)

FOREIGN PATENT DOCUMENTS

| | | |
|---|---|---|
| EP | 3093743 A1 | 11/2016 |
| EP | 3133468 A1 | 2/2017 |

(Continued)

OTHER PUBLICATIONS

International Search Report and Written Opinion regarding Application No. PCT/KR2018/003251, dated Jun. 22, 2018, 11 pages.

(Continued)

*Primary Examiner* — Dhairya A Patel
*Assistant Examiner* — Sujana Khakural (57) ABSTRACT

A method and system for delivering notifications to electronic devices is disclosed. The method includes receiving, by an electronic device, one or more settings, the settings including an instruction to search for available notification services. The method further includes searching, in response to the instruction, for available notification services, and subscribing to at least one notification service discovered as a result of the search. The method further includes displaying, by the electronic device, notification messages received from the at least one notification service.

20 Claims, 6 Drawing Sheets

(56) References Cited

U.S. PATENT DOCUMENTS

| | | | |
|---|---|---|---|
| 2004/0030753 A1 | 2/2004 | Horvitz | |
| 2004/0068481 A1* | 4/2004 | Seshadri | G06Q 30/02 |
| 2009/0239497 A1 | 9/2009 | Sennett et al. | |
| 2011/0230210 A1* | 9/2011 | Drennan | H04W 68/005 |
| | | | 455/456.3 |
| 2012/0258691 A1 | 10/2012 | Baer et al. | |
| 2012/0302289 A1 | 11/2012 | Kang | |
| 2012/0303774 A1* | 11/2012 | Wilson | H04L 51/214 |
| | | | 709/223 |
| 2014/0085316 A1 | 3/2014 | Narayanan | |
| 2014/0164557 A1* | 6/2014 | Keskitalo | H04W 4/02 |
| | | | 709/217 |
| 2014/0194062 A1* | 7/2014 | Palin | H04W 8/005 |
| | | | 455/41.2 |
| 2014/0372522 A1* | 12/2014 | Orona | H04L 65/403 |
| | | | 709/204 |
| 2015/0080032 A1* | 3/2015 | Moldavsky | H04W 4/02 |
| | | | 455/456.3 |
| 2015/0095717 A1* | 4/2015 | Frenz | G06F 11/2294 |
| | | | 714/46 |
| 2015/0141055 A1 | 5/2015 | Barrand | |
| 2015/0229712 A1* | 8/2015 | Zhang | H04L 67/59 |
| | | | 709/204 |
| 2015/0269702 A1* | 9/2015 | Miasnik | G06Q 10/00 |
| | | | 705/325 |
| 2015/0350146 A1* | 12/2015 | Cary | H04L 51/14 |
| | | | 709/206 |
| 2016/0092923 A1* | 3/2016 | Grenier | G06F 16/9537 |
| | | | 705/14.36 |
| 2016/0124499 A1 | 5/2016 | Shiu et al. | |
| 2017/0075737 A1 | 3/2017 | Kim et al. | |
| 2018/0047212 A1* | 2/2018 | Long | G06T 19/006 |

FOREIGN PATENT DOCUMENTS

| | | |
|---|---|---|
| KR | 10-2015-0135846 A | 12/2015 |
| WO | WO2013120064 A1 | 8/2013 |
| WO | 2013/189218 A1 | 12/2013 |

OTHER PUBLICATIONS

Supplementary European Search Report dated Jan. 2, 2020 in connection with European Patent Application No. 18 77 8297, 8 pages.
Communication pursuant to Article 94(3) EPC dated Mar. 22, 2021 in connection with European Application No. 18778297.4, 7 pages.
European Communication pursuant to Article 94(3) EPC in connection with counterpart European Patent Application No. 18778297.4 dated Jun. 3, 2022, 6 pages.
Communication pursuant to Article 94(3) EPC dated Jun. 9, 2023 in connection with European Patent Application No. 18778297.4, 8 pages.

* cited by examiner

SYSTEMS AND METHODS FOR NOTIFICATION DELIVERY

TECHNICAL FIELD

This disclosure relates generally to notification delivery. More specifically, this disclosure relates to systems and methods for delivering notifications to electronic devices without disturbing a user of the device.

BACKGROUND

Virtual reality headsets are increasingly common, but users of virtual reality headsets are disconnected from the physical world around them while experiencing virtual reality. As a result, a person who is not using a virtual reality headset may have some difficulty communicating with a user of a virtual reality headset without disturbing the user of the virtual reality headset. Additionally, a user of a virtual reality headset may miss important information in the environment around them, such as emergency notifications issued by, for example, a public address system.

SUMMARY

Embodiments of the present disclosure provide systems and methods for delivering notifications to electronic devices without disturbing a user of the device. Some embodiments of the present disclosure provide systems and methods for nearby peer-to-peer communication between electronic devices.

In one embodiment, a method is disclosed. The method includes receiving, by an electronic device, one or more settings, the settings including an instruction to search for available notification services. The method further includes searching, in response to the instruction, for available notification service, subscribing to at least one notification service discovered as a result of the search, and displaying, by the electronic device, notification messages received from the at least one notification service.

In another embodiment, an electronic device is disclosed. The electronic device includes a transmitter, a receiver, and a controller. The controller is configured to receive one or more settings, the settings including an instruction to search for available notification services. The controller is further configured to cause the transmitter and the receiver to search, in response to the instruction, for available notification services, subscribe to at least one notification service discovered as a result of the search, and cause a display of the electronic device to display notification messages received from the at least one notification service.

In yet another embodiment, a non-transitory computer readable medium embodying a computer program is disclosed. The computer program includes computer readable program code that when executed causes at least one processor to receive one or more settings, the settings including an instruction to search for available notification services, search, in response to the instruction, for available notification services, subscribe to at least one notification service discovered as a result of the search, and cause a display of an electronic device to display notification messages received from the at least one notification service.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that users of virtual reality headsets may be drawn into a virtual reality experience to the exclusion of the real world around them. Accordingly, if a person who is not experiencing virtual reality wishes to communicate with a person that is experiencing virtual reality, they may be forced to physically interrupt the virtual reality experience by tapping the person who is experiencing virtual reality, which may startle or upset the person. Additionally, the person experiencing virtual reality may not see or hear important messages in the environment, such as notifications delivered over a public address system, or signs, lights, or the like that are visible in the environment for notification purposes.

Accordingly, the present disclosure includes systems and methods to allow a person using a virtual reality headset to receive notifications from other people around them and to receive notifications from environmental sources. In various embodiments, these notifications are delivered through short range communication methods such as Bluetooth®, Wi-Fi®, near field communications (NFC), or the like.

The systems and methods of the present disclosure may also be used with electronic devices that do not provide virtual reality experiences. For example, a mobile device may provide an augmented reality (AR) experience by overlaying computer generated graphics on an image of a camera that is displayed on a mobile device display. Although less immersive than a virtual reality experience, an AR experience still demands a user's full focus on the mobile device display. Additionally, the present disclosure recognizes that users of mobile devices often become very focused on interacting with their mobile devices in other use cases, for example by watching media content, messaging contacts, reading web page content, or the like. In some cases, these users become so focused on their mobile devices that they do not see or hear what is happening around them. Accordingly, systems and methods of the present disclosure may be useful to provide notifications to users of mobile devices even though they are not experiencing virtual reality.

Figure 1:
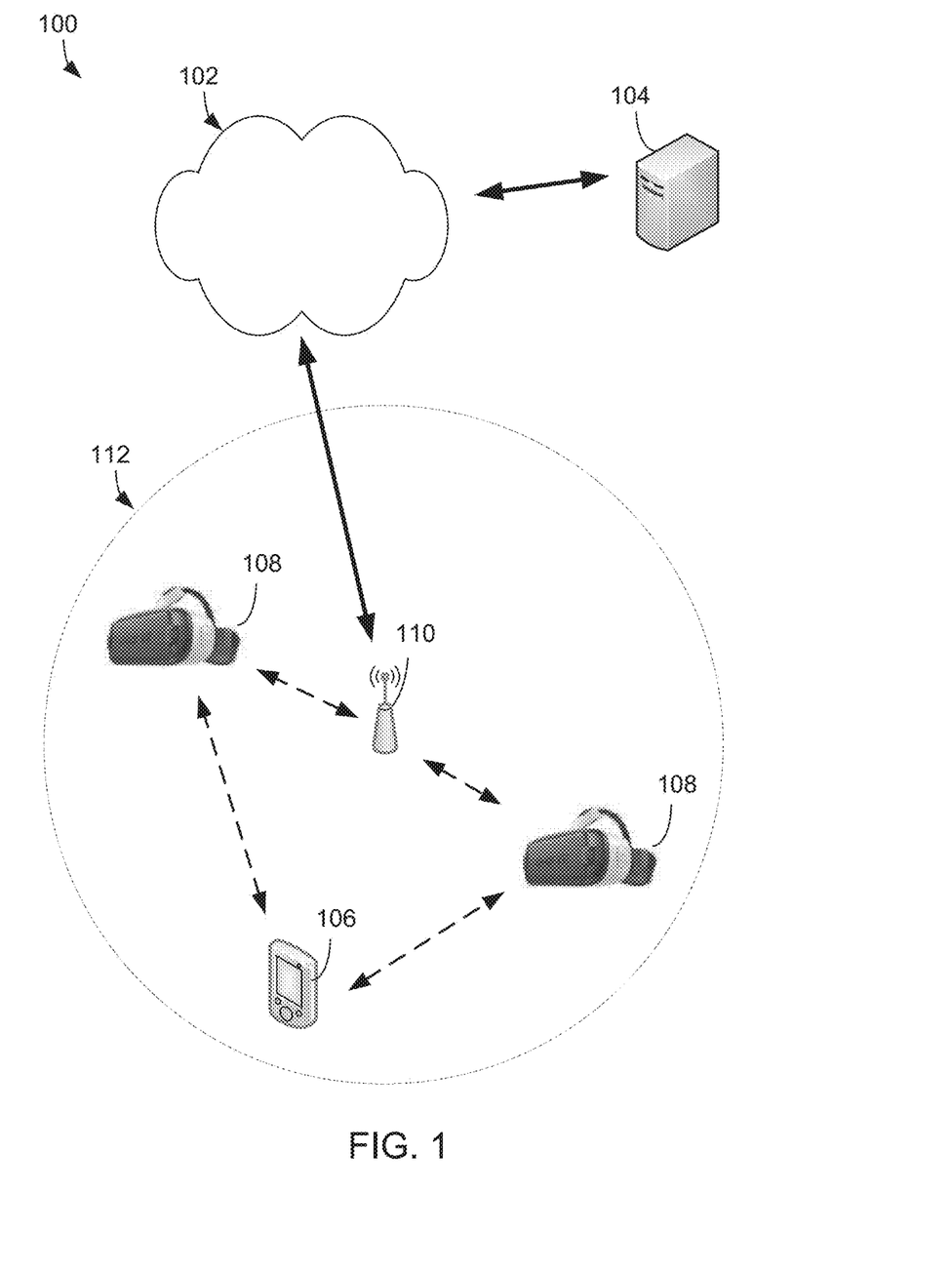
FIG. 1 illustrates an example computing system according to illustrative embodiments of the present disclosure.

FIG. 1 illustrates an example computing system 100 according to various embodiments of this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 may facilitate communications between at least one notification server 104 and personal electronic devices such as mobile device 106 or virtual reality devices 108. Each notification server 104 includes any suitable computing hardware or processor that can provide computing services for one or more personal electronic devices. Each notification server 104 could, for example, include one or more processors, one or more memories storing instructions and data, and one or more network interfaces facilitating communication over the network 102.

The mobile device 106 may be any suitable computing or processing device that interacts with at least one server or other computing device(s) over the network 102. The mobile device 106 could alternatively be a smart watch, fitness tracker, or other wearable device, a personal digital assistant (PDA), a laptop computer, or a tablet computer.

The virtual reality device 108 may be any suitable computing or processing device that interacts with at least one server or other computing device(s) over the network 102, and is able to provide a virtual reality experience. The virtual reality device 108 could, for example, be a mobile device such as a mobile phone used in a headset, an accessory device connected to another computing device, a virtual reality headset, or the like. Any other or additional electronic devices could be used in the computing system 100.

In this example, the mobile device 106 and virtual reality devices 108 communicate directly with each other. For example, the mobile device 106 and virtual reality devices 108 communicate via Bluetooth®, Wi-Fi Direct®, NFC, or the like. In other embodiments, the mobile device 106 and virtual reality devices 108 communicate indirectly with the network 102. For example, the mobile device 106 and virtual reality devices 108 communicate via one or more base stations 110, such as IEEE 802.11 wireless access points, or via cellular base stations or eNodeBs. Note that these examples are for illustration only and that the mobile device 106 and virtual reality devices 108 could communicate directly or indirectly with each other or indirectly with the network 102 via any suitable intermediate device(s) or network(s).

As described in more detail below, the notification server 104 may provide notifications through a notification subscription service to the virtual reality devices 108. In some embodiments, a user of the virtual reality device 108 subscribes to a notification service for the surrounding area 112, and the notification server 104 pushes notifications to the virtual reality devices 108. In other embodiments, the virtual reality devices 108 automatically subscribes to a notification service when it arrives in the area 112, and the notification server 104 pushes notifications to the virtual reality devices 108.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
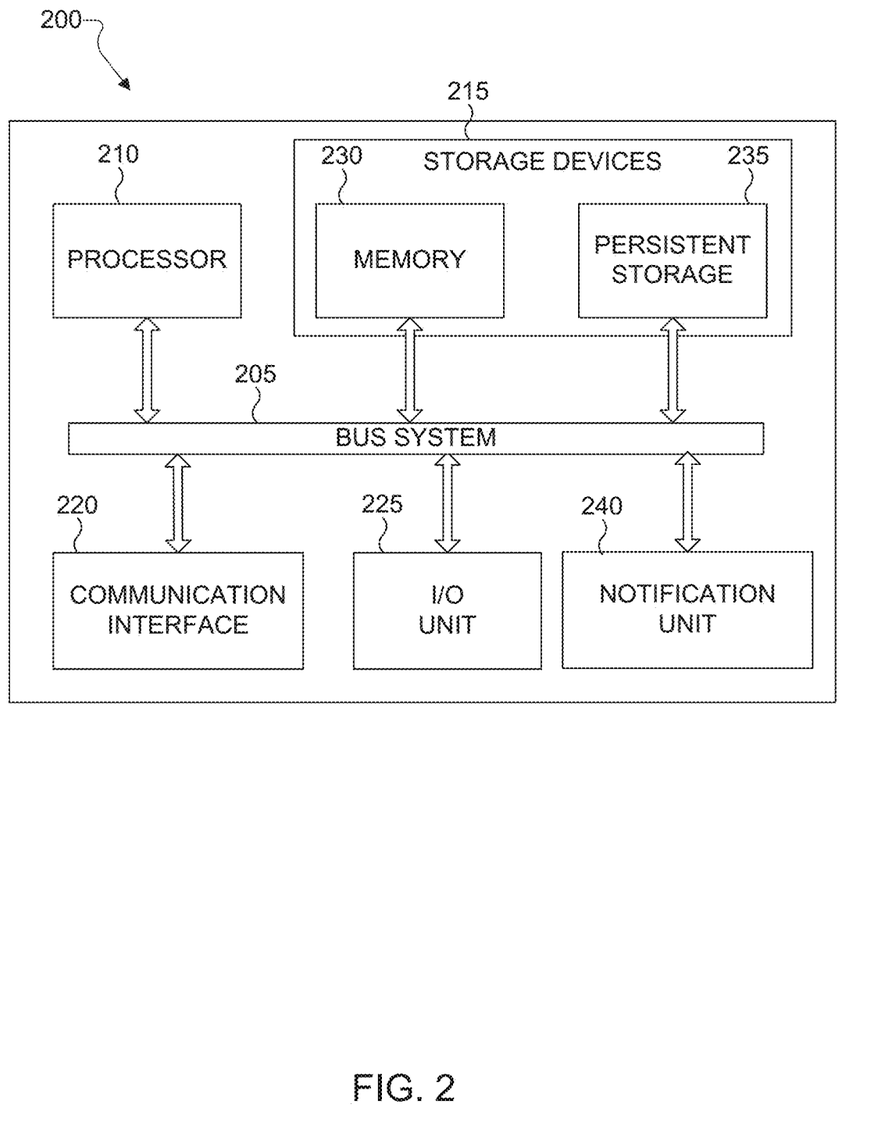
FIG. 2 illustrates an example computing system according to illustrative embodiments of the present disclosure.
Figure 3:
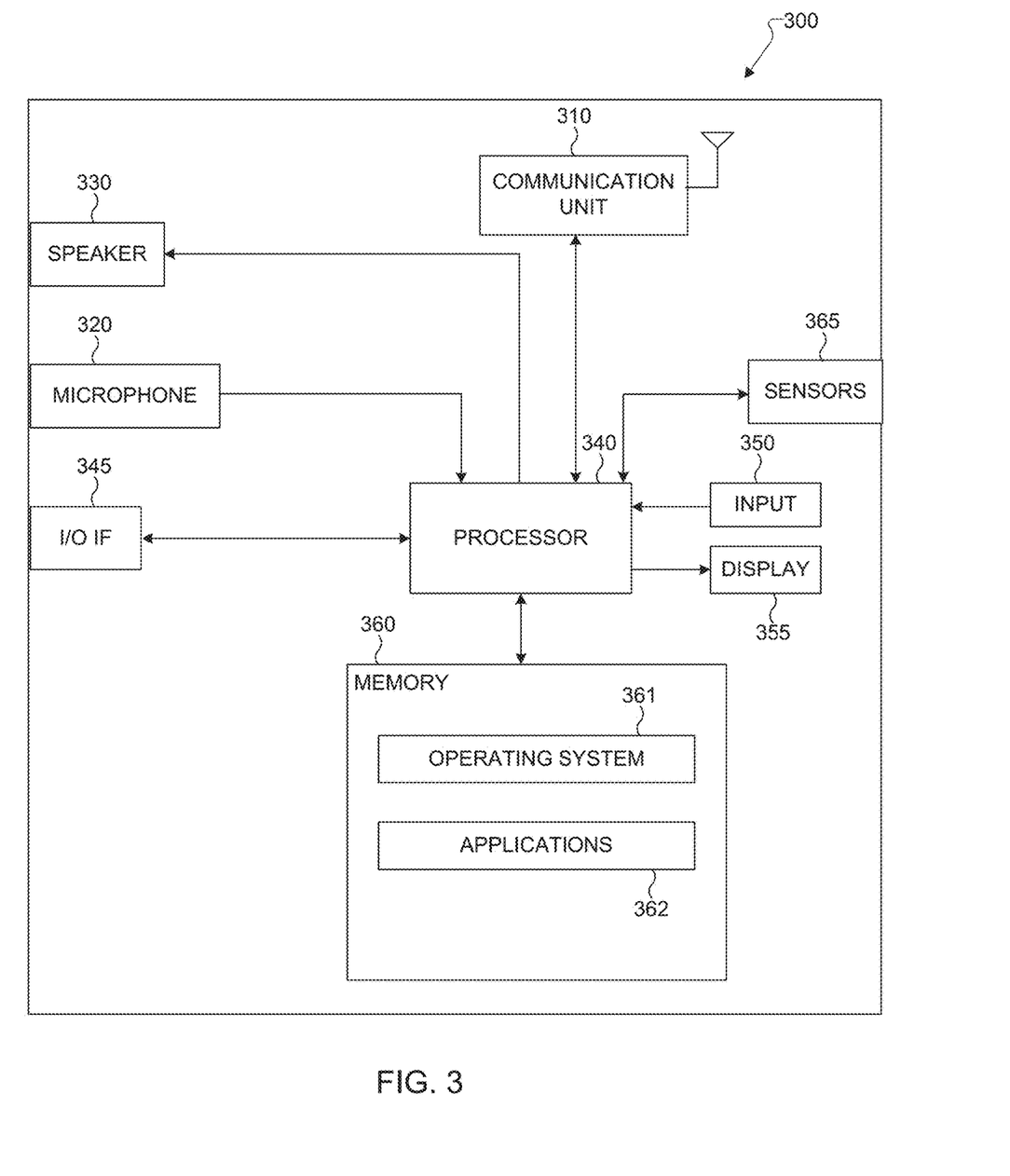
FIG. 3 illustrates an example electronic device according to illustrative embodiments of the present disclosure.

FIGS. 2 and 3 illustrate example devices in a computing system according to this disclosure. In particular, FIG. 2 illustrates an example computer system 200, FIG. 3 illustrates an example electronic device 300. For example, the computer system 200 could represent the notification server 104 in FIG. 1, the electronic device 300 could represent the virtual reality device 108 and/or the mobile device 106 in FIG. 1. In some embodiments, the electronic device 300 could comprise a mobile phone combined with a virtual reality accessory, such as a headset.

As shown in FIG. 2, the computer system 200 includes a bus system 205, which supports communication between at least one processor 210, at least one storage device 215, at least one communication interface 220, at least one input/output (I/O) unit 225, and a notification unit 240.

The processor 210 executes instructions that may be loaded into a memory 230. The processor 210 may include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a read only memory, hard drive, Flash memory, or optical disc.

The communication interface 220 supports communications with other systems or devices. For example, the communication interface 220 could include a network interface card or a wireless transceiver facilitating communications over the network 102, which may be, for example, a LAN that covers the area 112 of FIG. 1. The communication interface 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

The notification unit 240 handles subscription notification services for electronic devices such as the virtual reality devices 108 and the mobile device 106, as will be described in more detail below. The notification unit 240 receives requests to subscribe virtual reality devices 108 to notification services and handles the setup of such notification services with the requesting devices. The notification unit 240 additionally determines when a notification should be sent to a subscribed device, and handles pushing notifications to subscribed devices, for example via the communication interface 220. The notification unit 240 may operate a push notification service that facilitates push notification delivery to subscribed devices. In some embodiments, the notification unit 240 performs the same functions for electronic device 300.

Note that while FIG. 2 is described as representing the notification server 104 of FIG. 1, the same or similar structure could be used in the mobile device 106 or any other electronic device in system 100.

As shown in FIG. 3, the electronic device 300 includes a communication unit 310 that may include, for example, a radio frequency (RF) transceiver, a Bluetooth® transceiver, or a Wi-Fi® transceiver. The electronic device 300 also includes a speaker 330, a processor 340, an input/output (I/O) interface (IF) 345, an input interface 350, a display 355, a memory 360, and sensors 365. The memory 360 includes an operating system (OS) program 361 and one or more applications 362. In some embodiments, the electronic device 300 also functions as a mobile phone.

The communication unit 310 may receive an incoming RF signal such as a Bluetooth® or Wi-Fi® signal. The communication unit 310 may down-convert the incoming RF signal to generate an intermediate frequency (IF) or baseband signal, then generate a processed baseband signal by filtering, decoding, and/or digitizing the baseband or IF signal. The communication unit 310 transmits the processed baseband signal to the processor 340 for further processing (such as for web browsing data, online gameplay data, notification data, or other message data).

The communication unit 310 also receives analog or digital voice data or other outgoing baseband data (such as web data, e-mail, or interactive video game data) from the processor 340. The communication unit 310 encodes, multiplexes, and/or digitizes the outgoing baseband data to generate a processed baseband or IF signal. In the case that the communication unit 310 is an RF transceiver, the communication unit 310 up-converts the baseband or IF signal to an RF signal that is transmitted via an antenna.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the communication unit 310 in accordance with well-known principles. The processor 340 could also receive analog or digital voice data from the microphone 320, and output analog or digital audio to the speaker 330. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from external devices or an operator. The processor 340 is also coupled to the I/O interface 345, which provides the electronic device 300 with the ability to connect to other devices such as laptop computers and handheld computers. The I/O interface 345 is the communication path between these accessories and the processor 340.

The processor 340 is also coupled to the input interface 350 and the display 355. The operator of the electronic device 300 can use the input interface 350 to enter data into the electronic device 300. The display 355 may be a liquid crystal display or other display capable of rendering a virtual reality environment, including rendering text and/or graphics in the virtual reality environment, such as notifications and messages.

The memory 360 is coupled to the processor 340. Part of the memory 360 could include a random access memory (RAM), and another part of the memory 360 could include a Flash memory or other read-only memory (ROM).

The sensors 365 detect information external to the electronic device 300 and relay it to the processor 340 for further processing. For example, the sensors 365 may detect patterns of light that correspond to emergency lighting, patterns of sound that correspond to sirens or other emergency notifications, or the like.

Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the processors 210 and 340 could be divided into multiple processors, such as one or more central processing units (CPUs) and one or more graphics processing units (GPUs). In addition, as with computing and communication networks, electronic devices and computer systems can come in a wide variety of configurations, and FIGS. 2 and 3 do not limit this disclosure to any particular client device or server.

Figure 4:
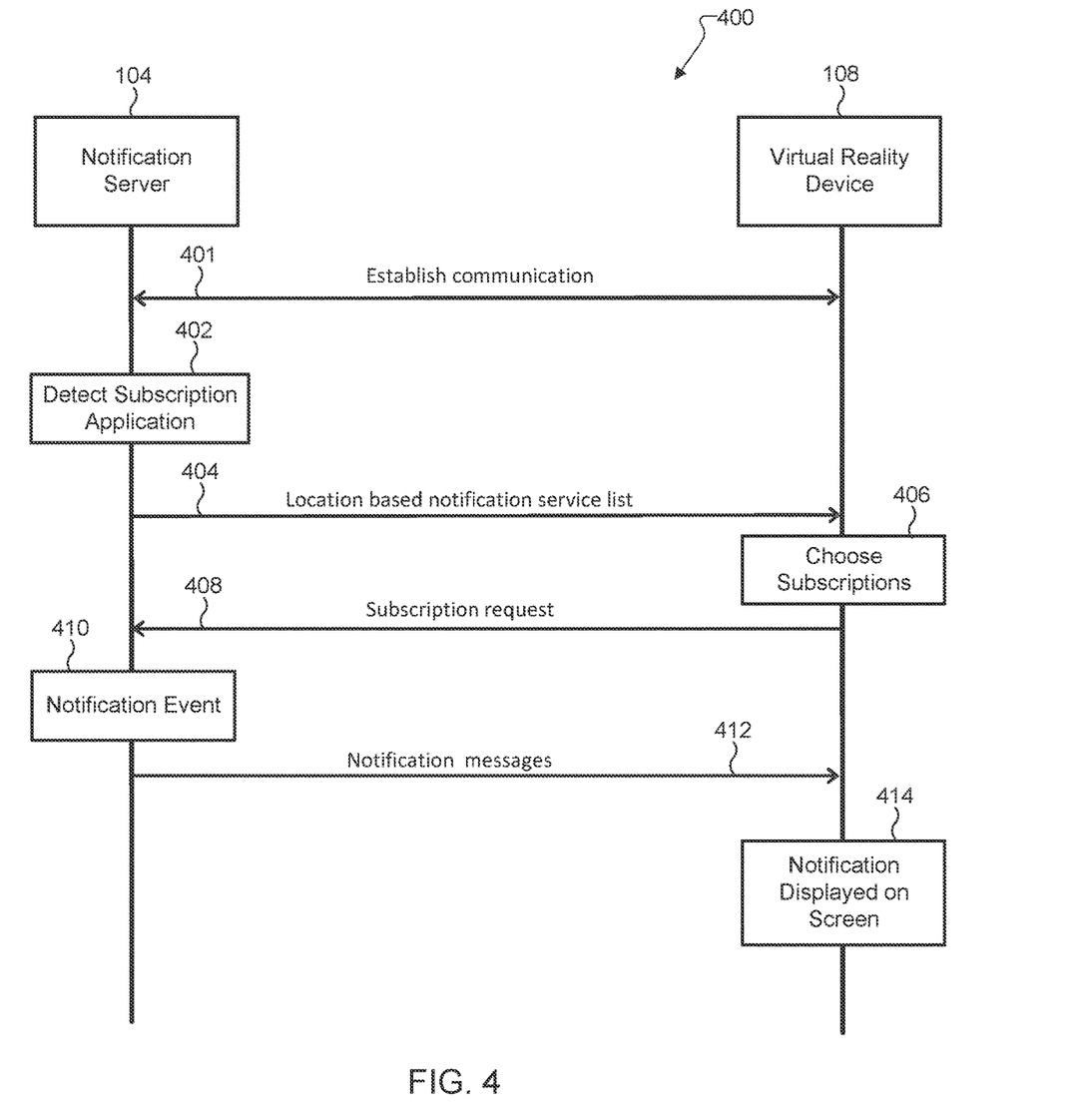
FIG. 4 illustrates an example signal diagram of communications between a notification server and a virtual reality device according to illustrative embodiments of the present disclosure.

FIG. 4 illustrates an example signal sequence 400 of communications between a notification server 104 and a virtual reality device 108 according to illustrative embodiments of the present disclosure. In this embodiment, the notification server 104 provides notifications to the virtual reality device 108 based on a subscription notification service.

In some embodiments, the virtual reality device 108 runs an application that facilitates subscribing to a push notification service, which may be called a subscription notification application. Upon entering the area 112 of FIG. 1 the application may facilitate communication between a notification server 104 operating in the area 112, either directly via base station 110 or indirectly via network 102 and base station 110, and the virtual reality device 108 as illustrated in signal diagram 400. In other embodiments, the functions of the application may be built into the operating system 361 of the virtual reality device 108.

In this example, the area 112 corresponds to a location such as a cafe, an airport, an airplane cabin, a train, a bus, a ferry, a waiting area, or another similar public location where a user of a virtual reality device 108 may be stationary and may engage in a virtual reality experience. In some embodiments, the notification server 104 may be owned and operated by an owner of the location that includes area 112, for example an owner of a cafe or an airline that owns an airplane. In other embodiments, the notification server 104 may be a cloud server that is rented by an owner of the location that includes area 112.

In a preliminary operation the notification server 104 and virtual reality device 108 establish communication by exchanging any appropriate messages. This may occur, for example, when the virtual reality device 108 enters the area 112. In one embodiment, the notification server 104 may periodically send out discovery information that allows the virtual reality device 108 to discover and begin communication with the notification server 104. Alternatively, the virtual reality device 108 may send out a discovery request that prompts the notification server 104 to send discovery information to the virtual reality device 108. In some embodiments, the information provided by the notification server 104 to the virtual reality device 108 may indicate that the notification server 104 provides subscription notification services. The messages exchanged at the preliminary operation may include a request from the virtual reality device 108 for available subscription notification services. The messages exchanged at the preliminary operation may also include an indication from the virtual reality device 108 that the virtual reality device 108 is running a subscription notification application.

When communication between the notification server 104 and the virtual reality device 108 has been established, the notification server 104 detects the application running on the virtual reality device 108 at operation 402, for example based on the messages received in the preliminary operation. In some embodiments, the virtual reality device 108 transmits a message requesting a list of subscription notification services that are available at the location of area 112.

In message 404, the notification server 104 transmits to the virtual reality device a list of subscription notification services that are available at the location of area 112. For example, if the area 112 is inside an airport, the available subscription notifications services may include flight departure notifications, flight arrival notifications, airport emergency notifications, or the like. In some embodiments, the list of available subscription notification services may include additional information, such as a category identifier (e.g., emergency notifications, convenience notifications, or the like). Further levels of identifier granularity may be provided, for example flight departure notifications may include a sub-category of all departures for a certain airline, departure time of specific flights, life-threatening emergencies, or the like.

At operation 406, a user of the virtual reality device 108 may select one or more of the available subscription notification services to subscribe to. In some embodiments, the list of available notification services may be presented on a display such as display 355 of the virtual reality device 108 so that the user may view and select from the list. In other embodiments, the virtual reality device 108 may automatically choose subscriptions without direct user input. For example, the user may pre-configure the virtual reality device 108 to automatically subscribe to certain categories of subscription notification services (e.g., emergency notifications), or to specific subscription notification services (e.g., flight departure notifications) when they are available. In such a case, the virtual reality device 108 may automatically select available subscription notification services without disturbing the user.

In message 408, the virtual reality device 108 transmits to the notification server 104 a request to subscribe to the subscription notification services selected in operation 406. The notification server 104 may track subscriptions in various ways. For example, the notification server 104 may maintain and update a list of virtual reality devices 108 that are subscribed to each offered subscription notification service, may maintain a separate list of subscriptions for each virtual reality device 108 in area 112, or the like.

At operation 410, the notification server 104 detects an event. For example, the notification server 104 may communicate with another server that tracks flight departure and arrival status, and may monitor for events such as changes in departure and arrival times as well as arrivals and departures that are about to occur. The notification server 104 then determines whether a detected event constitutes a notification event for any virtual reality devices 108. For example, the notification server 104 compares the event with a list or database of events that are designated as notification events for a particular subscription notification service.

In message 412, the notification server 104 responds to the detected notification event by transmitting to the virtual reality device 108 a notification message. The notification message may contain a subscription service identifier to inform the virtual reality device 108 to which subscription the notification pertains. The notification message may further contain information describing the event. For example, the notification message may include a tag or code indicating that a flight departure time has changed, that a flight is about to arrive, or the like. In some embodiments, the virtual reality device 108 may maintain a list of tags or codes that correspond to various pre-configured notification events. In other embodiments, a notification message may include plain text that describes the notification event.

At operation 414, the virtual reality device 108 presents a notification corresponding to the notification event on a display 355 of the virtual reality device 108. In some embodiments, the virtual reality device 108 may use a tag or code included in the message 412 to look up a notification event in a list or database. The list or database may include a plaintext notification that corresponds to the tag or code, and the virtual reality device 108 may present this plaintext message on the display 355. In other embodiments, the message 412 contains a custom plaintext message, and the virtual reality device 108 presents this plaintext message on the display 355.

In some embodiments, the messages of signal diagram 400 may be facilitated by a push notification service. It is understood that any suitable method of enabling push notifications may be used in the operations of signal diagram 400. In some embodiments, a notification server 104 is unnecessary to the operation of the subscription notification service. Instead, the subscription notification application running on the virtual reality device 108 may create its own notifications. For example, the application may search the Internet for information that indicates a notification should be generated (e.g., searching an airline website for flight delay information). The application may use a cellular data service or a Wi-Fi® connection via base station 110 to perform this search. Alternatively, the application may access sensors 365 of the virtual reality device 108 and determine whether to display a notification message based on sensed information (e.g., sensing an emergency siren via an external microphone on the virtual reality device 108, sensing a "fasten seatbelt" tone on an airplane via an external microphone on the virtual reality device 108, sensing a "fasten seatbelt" visual indicator on an airplane via an external camera on the virtual reality device 108, etc.).

Although FIG. 4 illustrates an example of communications between a notification server 104 and a virtual reality device 108, various changes could be made to FIG. 4. For example, the virtual reality device 108 could be a mobile device. Additionally, some communications shown in FIG. 4 could be excluded, or additional communications could be included.

Figure 5:
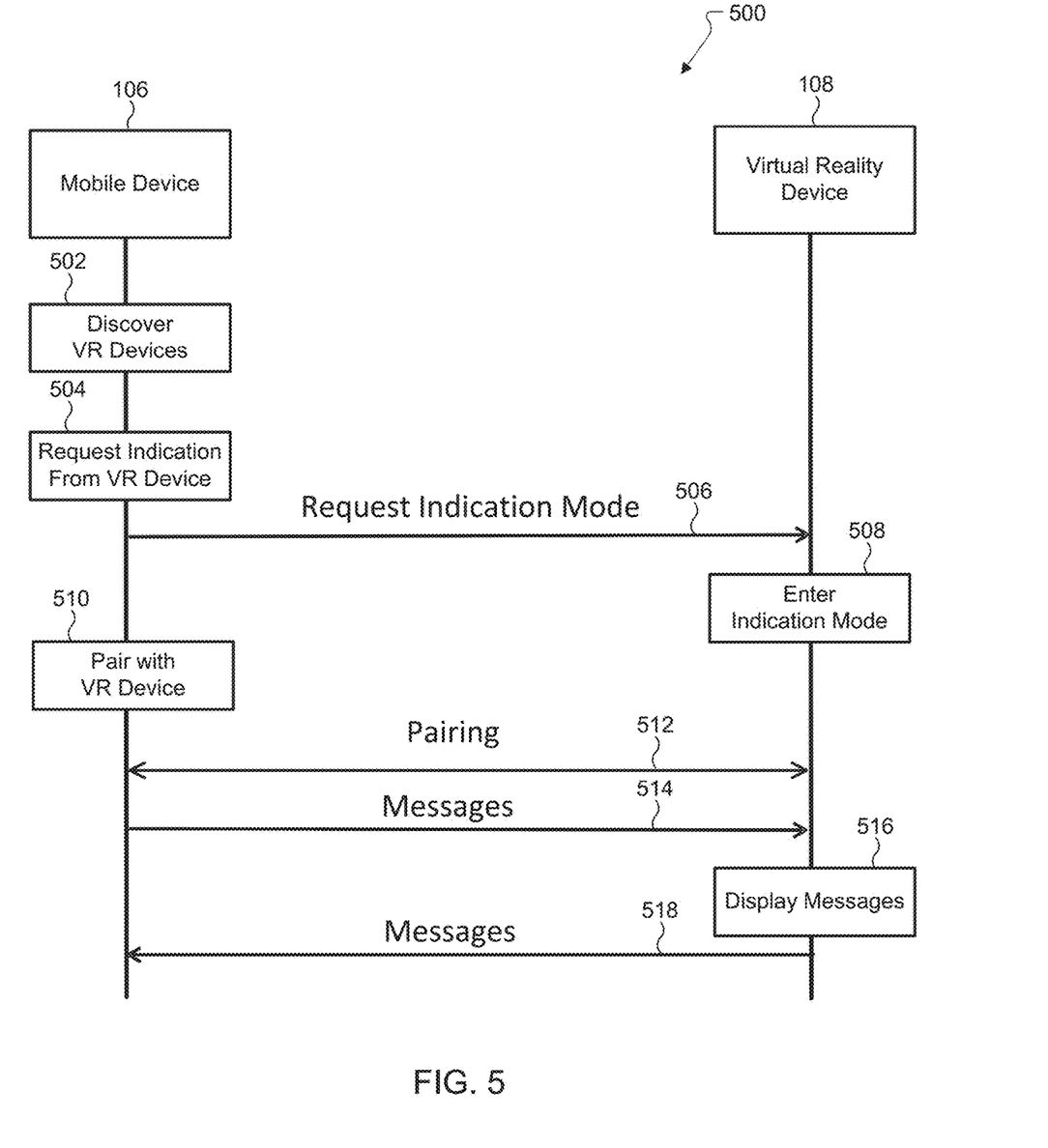
FIG. 5 illustrates an example signal diagram of communications between a mobile device and a virtual reality device according to illustrative embodiments of the present disclosure.

FIG. 5 illustrates an example signal sequence 500 of communications between a mobile device 106 and a virtual reality device 108 according to illustrative embodiments of the present disclosure. In this embodiment, the mobile device 106 and the virtual reality device 108 communicate via a peer-to-peer (P2P) connection.

At operation 502, the mobile device 106 discovers virtual reality devices 108 that are within discovery range. The discovery range may be, for example, the range of a wireless communications protocol used to discover the virtual reality devices 108, such as Wi-Fi Direct®, Bluetooth®, or the like. In some embodiments, the area 112 of FIG. 1 may correspond to the discovery range of the mobile device 106. In this example, at least one virtual reality device 108 has previously entered a discoverable state that allows discovery by mobile devices 106, for example by receiving a discovery request and returning a discovery response with identifying information for the virtual reality device 108. If the virtual reality device 108 has not entered a discoverable state, the mobile device 106 will not be able to discover it.

In response to discovering one or more virtual reality devices 108, the mobile device 106 may display a list of discovered devices, for example on a display of the mobile device 106. A user of the mobile device 106 may choose to pair with one or more virtual reality devices 108 on the list of discovered devices in order to enable P2P communication with the selected one or more virtual reality devices 108. However, in cases where more than one virtual reality device 108 is discovered, the user may not be certain which virtual reality device 108 belongs to the person that they wish to initiate P2P communications with.

In such a case, at operation 504, a user of the mobile device 106 selects a virtual reality device 108 from the list of discovered devices and requests that it enter an indication mode to assist the user of the mobile device 106 in determining which virtual reality device 108 to pair with. In some embodiments, a user of the mobile device 106 selects a virtual reality device 108 for this operation by highlighting the virtual reality device 108 in a user interface of the mobile device 106 for a predetermined period of time (also known as hovering).

In message 506, the mobile device 106 transmits a message to the selected virtual reality device 108 requesting that the virtual reality device 108 enter an indication mode. At operation 508, the virtual reality device 108 receives the message 506 and enters an indication mode. In this mode, for example, the virtual reality device 108 turns on or blinks a light emitting diode (LED) on the exterior of the device. The user of the mobile device 106 may look around the area 112 to visually determine which virtual reality device 108 they have selected based on the illuminated LED. In other embodiments, the indication mode may entail a different type of indication, such as a noise emitted by speakers on the virtual reality device 108.

The user of the mobile device 106 may, in some cases, repeat operation 504 and sequentially select each virtual reality device 108 on the list of discovered devices in this manner until the user of the mobile device 106 determines which virtual reality device 108 belongs to the person that they wish to initiate P2P communication with. In other embodiments, the user of the mobile device 106 may initiate a determination mode that automatically requests that each virtual reality device 108 on the list sequentially enter indication mode for a certain period of time. In some embodiments, the user of the mobile device 106 may repeat operation 504 sequentially by dragging a pointer across a list of virtual reality devices 108 in a user interface of the mobile device 106 to sequentially highlight each virtual reality device 108 for a period time. In this manner, the user of the mobile device 106 may sequentially select each virtual reality device 108 while looking around the area 112 at LEDs on the virtual reality devices 108 rather than looking at the mobile device 106.

At operation 510, the user of the mobile device 106, after determining which virtual reality device 108 they wish to communicate with, initiates communication with the selected virtual reality device 108. In some embodiments, for example when the mobile device 106 and the virtual reality device 108 communicate via Bluetooth®, the mobile device 106 and the virtual reality device 108 exchange pairing messages 512 to allow P2P communications. In other embodiments, pairing may not be necessary to establish a P2P connection, and pairing messages 512 are not exchanged.

After the devices are paired, the user of the mobile device 106 sends a P2P message to the virtual reality device 108. For example, the user of the mobile device 106 may select from a number of predetermined messages available through a messaging application (e.g., "Do you have time to talk?" or "Time to go"), or the user of the mobile device 106 may enter a custom message intended for the user of the virtual reality device 108.

At operation 516, the virtual reality device 108 displays the received P2P messages, for example on a display 355 of the virtual reality device 108. In this way, the user of the mobile device 106 may communicate with the user of the virtual reality device 108 without disturbing the user of the virtual reality device 108 during a virtual reality experience. In some embodiments, the virtual reality device 108 may be in a do-not-disturb (DND) mode. In this case, the virtual reality device 108 does not display the received message to the user. In some embodiments, the message is stored for later display after the DND mode is deactivated.

The user of the virtual reality device 108 may return a message 518 to the mobile device 106. For example, the user of the virtual reality device 108 may select from a number of predetermined messages (e.g., "No," or "Okay"), or may enter a custom message via a text entry interface of the virtual reality device 108. If the virtual reality device 108 is in a DND mode, the virtual reality device 108 may automatically return a message 518 indicating to the user of the mobile device 106 that the virtual reality device 108 is in a DND mode, and that the message 514 was received but not displayed.

Although FIG. 5 illustrates an example of communications between a mobile device 106 and a virtual reality device 108, various changes could be made to FIG. 5. For example, the virtual reality device 108 could be a second mobile device 106. Additionally, some communications shown in FIG. 5 could be excluded, or additional communications could be included.

Figure 6:
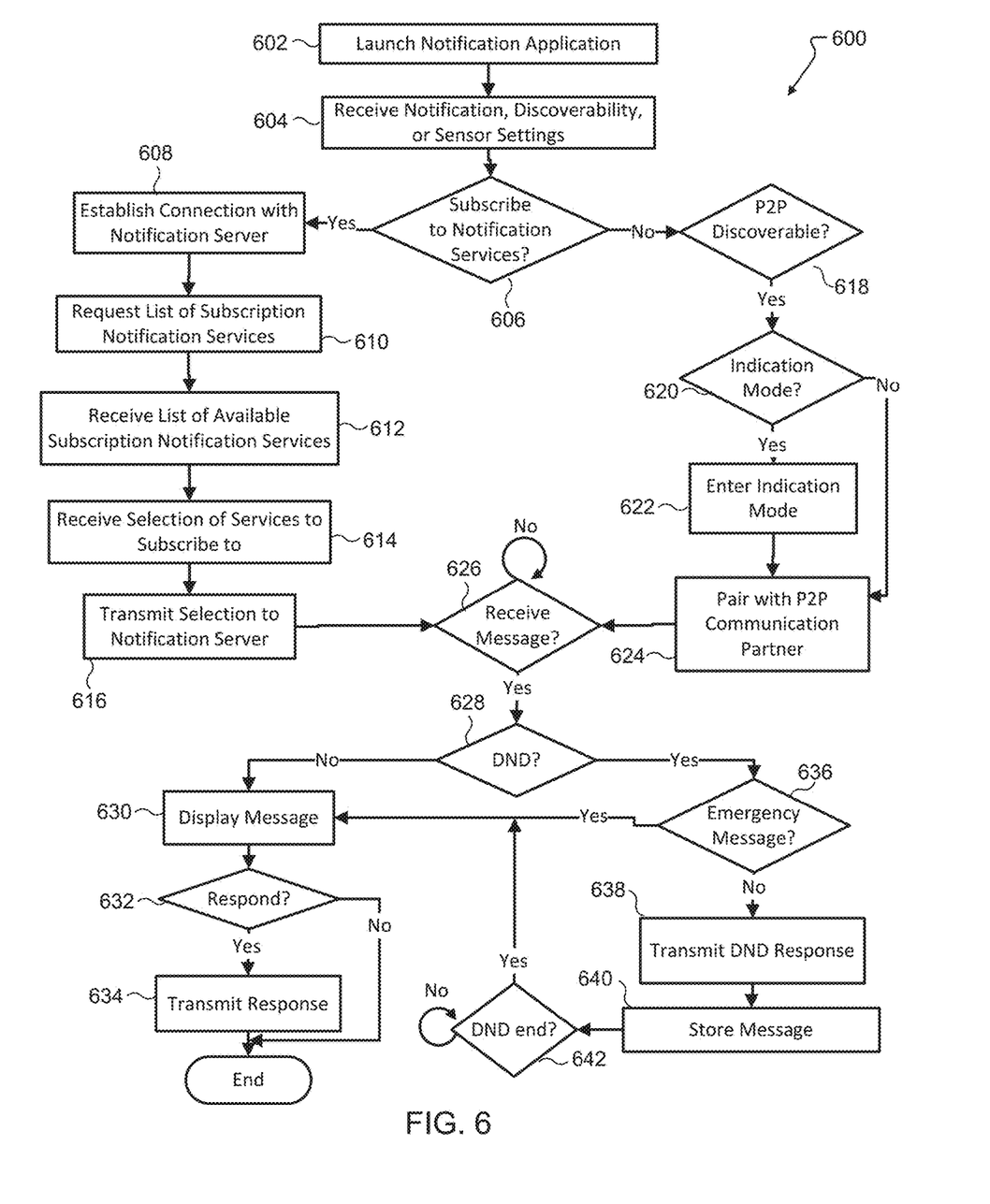
FIG. 6 illustrates a flow diagram of an example method for receiving notification messages according to illustrative embodiments of the present disclosure.

FIG. 6 illustrates a flow diagram of an example method 600 for receiving notification messages according to illustrative embodiments of the present disclosure. The method 600 may, for example, be performed by a virtual reality device 108, such as the virtual reality device 108 of FIG. 1.

Beginning at block 602, the virtual reality device 108 launches a notification application. The notification application facilitates communication with, for example, a notification server 104 to subscribe to subscription notification services, or with a mobile device 106 to receive incoming P2P messages. In some embodiments, the functions of the notification application are built into the operating system 361 of the virtual reality device 108, and a separate application is not launched.

At block 604, the virtual reality device 108 receives settings from a user for the notification application. The settings include, for example, whether or not to make the virtual reality device 108 discoverable for P2P communications. The settings further include, for example, whether to request information on subscription notification services upon entering an area 112 and communicating with a notification server 104, and whether to automatically subscribe to available subscription notification services. Subscription notification settings may further include categories (or category identifiers) or sub-categories of notifications to which the user wishes to automatically subscribe. For example, categories may include emergency notifications, convenience notifications, or the like, and sub-categories may include all flight departures for a certain airline, departure time of specific flights, life-threatening emergencies, or the like.

At decision block 606, if the settings of the application indicate that subscription notifications for area 112 are desired, the method 600 proceeds to block 608. If the settings of the application indicate that subscription notifications are not desired, the method 600 proceeds to decision block 618, described further below.

At block 608, the virtual reality device 108 establishes a connection with a notification server 104, for example as described above with respect to FIG. 4. In some embodiments, the virtual reality device 108 may perform the functions of the notification server, for example by searching the Internet for information relevant to potential notification events (e.g., flight departure times) and determining that notification events occur, as described above with respect to FIG. 4.

At block 610, the virtual reality device 108 requests a list of available subscription notification services from the notification server 104. At block 612, the virtual reality device 108 receives a list of available subscription notification services from the notification server 104. The virtual reality device 108 may then present the received list of subscription notification services to a user of the virtual reality device 108, for example via a user interface displayed on the display 355 of the virtual reality device 108.

At block 614, the virtual reality device 108 receives, from the user, a selection of one or more subscription notification services from the received list of available subscription notification services. The selection indicates which subscription notification services the user wishes to subscribe to. In some embodiments, the virtual reality device 108 may make this selection automatically based on the settings received at block 604. For example, the settings may indicate that the virtual reality device 108 should automatically subscribe to any subscription notification services that are categorized as emergency notification services. In such cases, the virtual reality device 108 may not present a choice to the user to subscribe to such subscription notification, but may instead subscribe automatically.

At block 616, the virtual reality device 108 transmits to the notification server 104 the selection of subscription notification services made in block 614. The method 600 then moves to decision block 618, which may also be reached if, at decision block 606, the virtual reality device 108 determines that no subscriptions to subscription notification services are to be made.

At decision block 618, if the settings of the application indicate that the virtual reality device 108 is to be discoverable for P2P communications, the method 600 proceeds to decision block 620. If at both decision blocks 606 and 618 the answer is no, then the method ends. If the answer to decision block 606 is yes and the answer to decision block 618 is no, then the method 600 proceeds to decision block 626.

At decision block 620, the virtual reality device 108 determines whether it has received a request from a potential P2P communication partner device to enter an indication mode. For simplicity, a mobile device 106 will be used to enter an indication mode. If so, the method 600 proceeds to block 622. If not, the method 600 proceeds to block 624.

At block 622, the virtual reality device 108 enters an indication mode and provides an indication for a predetermined amount of time. For example, the virtual reality device 108 illuminates or blinks an external LED for a period of 3 seconds. In another example, the virtual reality device 108 emits a predetermined sound pattern from an external microphone for 3 seconds.

At block 624, the virtual reality device 108 pairs with a mobile device 106. In some embodiments, the virtual reality device 108 is configured to allow for P2P communication without pairing, in which case block 624 is not performed.

At decision block 626, the virtual reality device 108 monitors for notifications from one or both of the notification server 104 and the mobile device 106. In some embodiments, the virtual reality device 108 also monitors for predetermined environmental conditions (e.g., emergency lights or sirens) with sensors 365. If no notification is received, the virtual reality device 108 returns to decision block 626 and continues to monitor for notifications. When a notification is received or an environmental signal is sensed, the method 600 proceeds to decision block 628.

At decision block 628, the virtual reality device 108 determines whether it is set in a do not disturb (DND) mode. If not, the method 600 proceeds to block 634. If a DND mode is set, the method 600 proceeds instead to decision block 636.

At block 630, the virtual reality device 108 displays a notification message based on the received notification or sensed environmental condition. The notification message may be displayed on the display 355 of the virtual reality device 108, which may include displaying the notification message in a virtual reality environment. In some embodiments, the received notification may be a plaintext message and the virtual reality device 108 may display the received message unaltered. In other embodiments, the received notification (or sensed environmental condition) may be encoded to represent one of a set of predetermined notification messages that are stored by the virtual reality device 108, and the corresponding notification message may be displayed by the virtual reality device 108.

At decision block 632, the virtual reality device 108 determines whether the user wishes to respond to the notification. For example, the virtual reality device 108 may prompt the user with the option to respond with one of a number of predetermined responses (e.g., "No," or "Okay"), or the option to respond with a custom message. In an embodiment where the received message is a subscription notification or a sensed environmental condition, no response may be possible. If the user does not wish to respond, or a response is not possible, the method 600 ends. If the virtual reality device 108 receives a response from the user, the method 600 proceeds to block 634.

At block 634, the virtual reality device 108 transmits the response to the mobile device 106, and the method 600 ends.

Returning to decision block 628, if the virtual reality device 108 is set to a DND mode, the method 600 proceeds to decision block 636. At decision block 636, the virtual reality device 108 checks whether the received notification or sensed environmental condition is identified as an emergency message or condition. For example, a flag or other identifier in the message may indicate an emergency message, or an identifier associated with the sensed environmental condition may indicate an emergency condition. If the message or condition is identified as an emergency message or condition, the method 600 proceeds to block 630 the message is displayed, as described above. If the message is not identified as an emergency message, the method 600 proceeds to block 638.

At block 638, the virtual reality device 108 automatically transmits to the mobile device 106 a message indicating that the virtual reality device 108 is in a DND mode and the received notification will not be displayed. In some embodiments, the virtual reality device 108 does not transmit this message, and simply does not respond to the received message.

At block 640, the virtual reality device 108 stores the received notification, for example in a memory 360, for later display.

At decision block 642, the virtual reality device 108 monitors for the end of the DND mode. If the DND mode has not ended, the method 600 repeats block 642. It is understood that the virtual reality device 108 may also monitor for additional received messages during this operation or any other operation of the method 600. If the DND mode has ended, the method 600 proceeds to block 630 and displayed notifications that were stored in the memory 360 during the DND mode.

Although FIG. 6 is described in the context of a virtual reality device 108, it is understood that various modifications may be made to FIG. 6. For example, the method 600 could be performed by a mobile device 106. This may be useful, for example, when a user of a mobile device 106 is immersed in a media experience and is likely to miss information in the environment around the mobile device 106, for example emergency lights, signs containing notifications, or the like.

Embodiments of the present disclosure provide systems and methods for sending and receiving messages from a virtual reality environment. For example, embodiments of the present disclosure describe setting up subscriptions to push notification services, monitoring for push notifications from the subscribed services, and displaying notification messages corresponding to received push notifications in a virtual reality environment. Embodiments of the present disclosure also provide systems and methods for receiving peer to peer communications from partner devices and displaying notification messages corresponding to the received peer to peer communications in a virtual reality environment. Embodiments of the present disclosure also provide systems and methods for sensing environmental conditions and displaying notification messages corresponding to the sensed conditions in a virtual reality environment.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method, comprising:
receiving, by an electronic device, one or more settings, wherein the one or more settings include a selection of one from among:
an instruction to search for available subscription notification services that are related to a local area around the electronic device upon connecting to at least one wireless local area network corresponding to the local area; and
an alternative instruction to not search for the available subscription notification services that are related to the local area upon connecting to the at least one wireless local area network corresponding to the local area;

in response to a determination that the one or more settings include the alternative instruction as the selection:

determining no subscriptions to subscription notification services are to be made; and upon connecting to the at least one wireless local area network corresponding to the local area, not searching for the available subscription notification services that are related to the local area around the electronic device; and in response to a determination that the one or more settings include the instruction as the selection:

upon connecting to the at least one wireless local area network corresponding to the local area, searching for the available subscription notification services that are related to the local area around the electronic device, wherein the searching includes:

establishing a connection with a subscription notification server;

transmitting, to the subscription notification server, a request for a list of the subscription notification services that are related to the local area; and receiving, from the subscription notification server, the list of the subscription notification services;

subscribing to at least one of the subscription notification services discovered as a result of the searching, wherein subscribing to the at least one subscription notification service includes choosing the at least one subscription notification service from the list of the subscription notification services;

monitoring the at least one wireless local area network for notification messages from the at least one subscription notification service; and displaying, by the electronic device, the notification messages from the at least one subscription notification service.

2. The method of claim 1, wherein the one or more settings further include an instruction to automatically subscribe to subscription notification services that provide a category of notifications, the method further comprising:

determining whether the at least one subscription notification service has a category identifier that matches the category of notifications, wherein choosing the at least one subscription notification service from the list of the subscription notification services includes determining whether the at least one subscription notification service has the category identifier that matches the category of notifications.

3. The method of claim 1, wherein the one or more settings further include an instruction to enter a discoverable mode for peer-to- peer (P2P) communication, the method further comprising:

becoming discoverable to peer electronic devices on the at least one wireless local area network for peer-to-peer communication in response to receiving the instruction to enter the discoverable mode for P2P communication; and displaying, by the electronic device, peer-to-peer messages received from at least one peer electronic device.

4. The method of claim 3, further comprising:

receiving, at the electronic device from the at least one peer electronic device, a request for an indication; and emitting, from the electronic device in response to receiving the request for the indication, at least one of a visible indication or an audible indication.

5. The method of claim 3, wherein becoming discoverable to the peer electronic devices on the at least one wireless local area network for P2P communication further comprises:

becoming discoverable to the peer electronic devices on the at least one wireless local area network for peer-to-peer communication in response to the determination that the one or more settings include the alternative instruction and a determination that the one or more settings include the instruction to enter the discoverable mode for P2P communication;

wherein the one or more setting are received from a user of the electronic device;

wherein receiving the one or more settings comprises:

receiving a first selection from among the instruction to search and the alternative instruction not to search; and receiving a second selection from among the instruction to enter the discoverable mode for P2P communication and an instruction to not enter the discoverable mode for P2P communication; and wherein not searching for the available subscription notification services comprises:

not transmitting the request for the list of the available subscription notification services that are related to the local area.

6. The method of claim 1, further comprising:

receiving, by the electronic device, an instruction to enter a do-not-disturb mode; and displaying, by the electronic device after receiving the instruction to enter the do-not-disturb mode, any of the notification messages that are indicated as emergency messages.

7. The method of claim 6, wherein the one or more settings further include an instruction to enter a discoverable mode for peer-to-peer (P2P) communication, the method further comprising:

becoming discoverable to peer electronic devices on the at least one wireless local area network for peer-to-peer communication in response to receiving the instruction to enter the discoverable mode for P2P communication; and in response to receiving a peer-to-peer message from a peer electronic device while the electronic device is the do-not-disturb mode, transmitting, to the peer electronic device, a return message indicating that the electronic device is in the do-not-disturb mode.

8. An electronic device, comprising:

a transmitter;

a receiver; and a controller configured to:

receive one or more settings, wherein the one or more settings include a selection of one from among:

an instruction to search for available subscription notification services that are related to a local area around the electronic device upon connecting to at least one wireless local area network corresponding to the local area; and an alternative instruction to not search for the available subscription notification services that are related to the local area upon connecting to the at least one wireless local area network correspondina to the local area;

in response to a determination that the one or more settings include the alternative instruction as the selection:
  determine no subscriptions to subscription notification services are to be made; and
  upon connecting to the at least one wireless local area network corresponding to the local area, cause the transmitter and the receiver to not search for the available subscription notification services that are related to the local area around the electronic device; and
in response to a determination that the one or more settings include the instruction as the selection:
  upon connecting to the at least one wireless local area network corresponding to the local area, search for the available subscription notification services that are related to the local area around the electronic device, wherein, to search for the available subscription notification services, the controller is configured to:
    establish a connection with a subscription notification server;
    cause the transmitter to transmit, to the subscription notification server, a request for a list of the subscription notification services that are related to the local area; and
    receive, from the subscription notification server, the list of the subscription notification services;
  subscribe to at least one of the subscription notification services discovered as a result of the search, wherein, to subscribe to the at least one subscription notification service, the controller is configured to choose the at least one subscription notification service from the list of the subscription notification services;
  monitor the at least one wireless local area network for notification messages from the at least one subscription notification service; and
  cause a display of the electronic device to display the notification messages from the at least one subscription notification service.

9. The electronic device of claim 8, wherein:
the one or more settings further include an instruction to automatically subscribe to subscription notification services that provide a category of notifications, and
the controller is further configured to:
  determine whether the at least one subscription notification service has a category identifier that matches the category of notifications; and
  choose the at least one subscription notification service from the list of the subscription notification services based on the category identifier.

10. The electronic device of claim 8, wherein:
the one or more settings further include an instruction to enter a discoverable mode for peer-to-peer (P2P) communication, and
the controller is further configured to:
  cause the electronic device to become discoverable to peer electronic devices on the at least one wireless local area network for peer-to-peer communication in response to the instruction to enter the discoverable mode for P2P communication; and
  cause the display to display peer-to-peer messages received from at least one peer electronic device.

11. The electronic device of claim 10, wherein the controller is further configured to:
  cause the receiver to receive, from the at least one peer electronic device, a request for an indication; and
  cause the electronic device to emit, in response to the request for the indication, at least one of a visible indication or an audible indication.

12. The electronic device of claim 8, wherein the controller is further configured to:
  cause at least one sensor of the electronic device to detect an event in an environment around the electronic device; and
  cause the display to display, in response to the event, a predetermined notification message corresponding to the event.

13. The electronic device of claim 8, wherein the controller is further configured to:
  cause the receiver to receive an instruction to enter a do-not-disturb mode; and
  after receiving the instruction to enter the do-not-disturb mode, cause the display to display any of the notification messages that are indicated as emergency messages.

14. The electronic device of claim 13, wherein:
the one or more settings further include an instruction to enter a discoverable mode for peer-to-peer (P2P) communication; and
the controller is further configured to:
  cause the electronic device to become discoverable to peer electronic devices on the at least one wireless local area network for peer-to-peer communication in response to the instruction to enter the discoverable mode for P2P communication; and
  in response to receiving a peer-to-peer message from a peer electronic device while the electronic device is the do-not-disturb mode, cause the electronic device to transmit, to the peer electronic device, a return message indicating that the electronic device is in the do-not-disturb mode.

15. A non-transitory computer readable medium embodying a computer program, the computer program comprising computer readable program code that, when executed, causes at least one processor of an electronic device to:
  receive one or more settings, wherein the one or more settings include a selection of one from among:
    an instruction to search for available subscription notification services that are related to a local area around the electronic device upon connecting to at least one wireless local area network corresponding to the local area; and
    an alternative instruction to not search for the available subscription notification services that are related to the local area upon connecting to the at least one wireless local area network corresponding to the local area;
  in response to a determination that the one or more settings include the alternative instruction as the selection:
    determine no subscriptions to subscription notification services are to be made; and
    upon connecting to the at least one wireless local area network corresponding to the local area, not search for the available subscription notification services that are related to the local area around the electronic device; and
  in response to a determination that the one or more settings include the instruction as the selection:
    upon connecting to the at least one wireless local area network corresponding to the local area, search for the available subscription notification services that are related to the local area around the electronic device, wherein the computer readable program code that when executed causes the at least one processor to search for the available subscription notification services comprises computer readable program code that when executed causes the at least one processor to:
 establish a connection with a subscription notification server;
 transmit, to the subscription notification server, a request for a list of the subscription notification services that are related to the local area; and
 receive, from the subscription notification server, the list of the subscription notification services;
subscribe to at least one of the subscription notification services discovered as a result of the search, wherein the computer readable program code that when executed causes the at least one processor to subscribe to the at least one subscription notification service includes computer readable program code that when executed causes the at least one processor to choose the at least one subscription notification service from the list of the subscription notification services;
monitor the at least one wireless local area network for notification messages from the at least one subscription notification service; and
cause a display of the electronic device to display the notification messages received from the at least one subscription notification service.

16. The non-transitory computer readable medium of claim 15, wherein:
 the one or more settings further include an instruction to automatically subscribe to subscription notification services that provide a category of notifications, and
 the computer readable program code, when executed, further causes the at least one processor to:
  determine whether the at least one subscription notification service has a category identifier that matches the category of notifications; and
  choose the at least one subscription notification service from the list of the subscription notification services based on the category identifier.

17. The non-transitory computer readable medium of claim 15, wherein:
 the one or more settings further include an instruction to enter a discoverable mode for peer-to-peer (P2P) communication, and
 the computer readable program code, when executed, further causes the at least one processor to:
  cause the electronic device to become discoverable to peer electronic devices on the at least one wireless local area network for peer-to-peer communication in response to the instruction to enter the discoverable mode for P2P communication; and
  cause the display to display peer-to-peer messages received from at least one peer electronic device.

18. The non-transitory computer readable medium of claim 17, wherein the computer readable program code, when executed, further causes the at least one processor to:
 receive, from the at least one peer electronic device, a request for an indication; and
 cause the electronic device to emit, in response to the request for the indication, at least one of a visible indication or an audible indication.

19. The non-transitory computer readable medium of claim 15, wherein the computer readable program code, when executed, further causes the at least one processor to:
 cause at least one sensor of the electronic device to detect an event in an environment around the electronic device; and
 cause the display to display, in response to the event, a predetermined notification message corresponding to the event.

20. The non-transitory computer readable medium of claim 15, wherein:
 the one or more settings further include an instruction to enter a discoverable mode for peer-to-peer (P2P) communication; and
 the computer readable program code, when executed, further causes the at least one processor to:
  receive an instruction to enter a do-not-disturb mode;
  cause the electronic device to become discoverable to peer electronic devices on the at least one wireless local area network for peer-to-peer communication in response to receiving the instruction to enter the discoverable mode for P2P communication; and
  in response to receiving a peer-to-peer message from a peer electronic device while the electronic device is the do-not-disturb mode, cause the electronic device to transmit, to the peer electronic device, a return message indicating that the electronic device is in the do-not-disturb mode.

* * * * *